Patented Nov. 30, 1926.

1,608,792

UNITED STATES PATENT OFFICE.

GEORGE W. HUEY, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

Application filed July 30, 1920. Serial No. 400,205.

My invention relates to motor control systems and particularly to slip regulators for controlling main motors for steel mills.

One object of my invention is to provide a system of motor control which shall prevent the starting of a main motor before the full starting resistance is in series with the secondary winding thereof.

A second object of my control system is to automatically change the resistance in series with the secondary winding of the main motor in accordance with the current in the primary-winding circuit.

Another object of my invention is to provide a torque motor for so regulating the starting resistance in series with the secondary winding of the main motor that the resistance shall be reduced slowly until the main motor has attained a certain speed and, afterward, the remaining resistance shall be removed at a greater speed.

A further object of my invention is to provide a control system which shall open the circuit breaker for the primary circuit of the main motor during underload or other abnormal conditions and shall prevent its closing until full starting resistance has been inserted in series with the secondary winding of the main motor.

Briefly speaking, one form of my invention consists in providing a control system comprising a torque motor that is provided with a regulating arm for controlling a liquid rheostat in series with the secondary winding of a main motor, a double-diameter dashpot for ensuring two speeds in moving the regulating arm, corresponding to the initial and the final stages in starting the main motor, the employment of a potential transformer for so resetting the regulating arm that full resistance is inserted in series with the secondary winding of the main motor and the employment of a series transformer in conjunction with the torque motor during normal running conditions.

The potential transformer is automatically removed from the torque-motor circuit by a time-limit relay, which also controls the energization of a latching coil on a device for locking the torque-motor arm. A second time-limit relay so controls the secondary circuits of the series transformer that full voltage is impressed by steps upon the torque motor.

These and other objects of my invention may be better understood by reference to the accompanying drawings, wherein Fig. 1 is a diagrammatic view of a main motor, a liquid rheostat in series with the secondary winding of the main motor, and a torque motor for regulating the rheostat in a system embodying my invention.

Fig. 2 is an enlarged view, in end elevation, of the torque motor, the rheostat and the counterweight that are shown in Fig. 1, with the addition of a double-diameter dashpot coacting therewith.

Fig. 3 is a view, in plan elevation, of the piston shown in Fig. 2 taken along the line III—III of Fig. 2.

Fig. 4 is a sectional view of the piston shown in Fig. 3 taken along the line IV—IV of Fig. 3.

Referring particularly to Fig. 1, the control system herein shown comprises a main induction motor 1 having a primary winding 2 and a secondary winding 3, a liquid rheostat 4 for varying the resistance in the secondary winding circuit, and a torque motor 5 having an arm 6 pivotally mounted upon the rotor shaft 7 thereof for regulating the resistance of the liquid rheostat 4.

The liquid rheostat 4 comprises a compartment 8 and a plurality of electrically connected plates 9 that are suspended from a bar 10, which is attached to the arm 6 by means of a rope or cable 11. The compartment 8 contains a suitable electrolyte 12 having a high electrical resistance. The arm 6 is so balanced that it tends to turn in a counter-clockwise direction.

The torque motor 5 has a primary winding 13 and a secondary winding 14. The secondary winding 14 is electrically connected in series with a permanent resistor 15.

The primary winding 13 of the torque motor 5 is electrically energized through the series transformer 16 during normal operating conditions and through the potential transformer 17 during abnormal conditions that occur during the initial period of starting the main motor. The abnormal The actuating coil 39 is energized by means of a circuit from the potential transformer 17 through conductors 70 and 71, actuating coil 29 of the time-limit relay 28, conductors 96 and 97, actuating coil 39 of the no-voltage release mechanism 36, conductors 98 and 98a, actuating coil 26 of the time-element relay 25, and conductors 99, 77, 78, 79, 80 to the supply conductor 68. The actuating coils 26 and 29 are so designed that each requires the full voltage between conductors 70 and 80 before actuating their respective time-limit relays 25 and 28; but the actuating coil 39 of the no-voltage release mechanism 36 is designed to be able to lock the latching device 38, although it is in series with them. The actuating coil 39 becomes active, upon the occurrence of a relatively low voltage between conductors 70 and 80 to allow the operation of the no-voltage release mechanism 36.

The lowering of the counterweight end of the arm 6 causes the closure of the contactor 37, thereby completing a circuit from the potential transformer 17 through conductors 70 and 71, actuating coil 29 of the time-limit relay 28, conductors 96 and 100, contact bridge 37a and conductors 101, 78, 79, 80 to the supply conductor 68. The coil 29, being energized by full voltage between conductors 70 and 80, raises the contact bridge 28a, thereby breaking the circuit comprising the coil 24 and causing the three-pole contactor 23 to open. The upward movement of the time-limit relay requires a few seconds, thereby ensuring the opening of contactor 23 before the main circuit-breaker 18 is closed.

When the contact bridge 28a attains its second or upper position, a circuit is established from the potential transformer 17 through conductors 70, 71, 72 and 73, contact bridge 28a of the time-limited relay 28, conductor 102, actuating coil 31 of the auxiliary contactor 32, and conductors 104, 79, 80 to supply conductor 68.

The energization of actuating coil 31 causes contactor 32 to close and, as the full resistance of the liquid rheostat 4 is in series with the secondary winding 3, it is permissible to close the main circuit-breaker 18.

An operator may close the main circuit-breaker 18 by so actuating the controller 40 that the contact segment 106 engages contact terminals 107 and 108. An electrical circuit is thereby established from the potential transformer 17, through conductors 70, 109 and 110, contact bridge 32a of the auxiliary relay 32, conductor 111, contact bridge 33a of the under-voltage release device 33, conductor 112, actuating coil 19 of the circuit-breaker 18, conductor 113, contact finger 107, contact segment 106 and conductors 114, 115 and 80 to supply conductor 68.

When the actuating coil 19 is energized, the three-pole circuit-breaker 18 closes, thereby completing a circuit from a set of conductors 61, 62 and 63 through contact bridges 18a, 18b and 18c, to a set of conductors 116, 117 and 118 and the primary winding 2 of the main motor 1.

The secondary winding 3 of the main motor 1 is electrically connected to the rheostat 4 by slip rings 119, 120 and 121, brushes 122, 123 and 124, a set of conductors 125, 126 and 127, and contact terminals 128, 129 and 130, in accordance with a familiar practice.

When the circuit-breaker 18 is closed, the auxiliary contact bridge 20a is moved to its upper position, thereby making a second gap in the circuit comprising the actuating coil 24 of the three-pole contactor 23 and prevents the contactor 23 from closing after the time-limit relay 28 returns to its lower position. This circuit has previously been broken by the contact bridge 28a being actuated to its upper position.

When the contactor bridge 20a is actuated to its upper position, a circuit is established from the potential transformer 17 through conductors 70, 71, 72, 131 and 132, contactor bridge 20a, conductors 133 and 98a, actuating coil 26 of the time-limit relay 25 and conductors 99, 77, 78, 79, 80 to the supply conductor 68. The completion of this circuit energizes the actuating coil 26 and slowly closes the time-limit relay 25.

The latching device 38 of the no-voltage release mechanism 36 is released simultaneously with the beginning of the upward movement of contact bridge 25a of the time-limit relay 25, as the actuating coil 39 of the no-voltage release mechanism 36 is shunted and substantially de-energized by the completion of the circuit comprising conductors 72, 131, 132, contactor bridge 20a and conductor 133, thus allowing the spring 38a to open the latching device 38 and permitting the arm 6 to rotate in a counter-clockwise direction. The contactor 37 is opened by a slight upward movement of the counterweight end of the arm 6 by the torque motor 5, as soon as the circuit breaker 18 is closed. This movement is permitted before the latching device 38 prevents farther movement.

As soon as the circuit-breaker 18 is closed, the series transformer 16 becomes energized, and the primary winding 13 of the torque motor 5 is energized therefrom through a set of conductors 134, 135, and 136, bridges 21a, 21b and 21c of the contactor 21, and the sets of conductors 137, 138 and 139; 140, 141 and 142, and 84, 85 and 86.

By connecting the winding 13 of the torque motor 5 to the mid-points or taps of the series transformer 16, the winding 13 is protected from the heavy rush of current that would otherwise be induced in the series transformer 16 during the initial period that said main induction motor 1 is starting. The energization of the winding 13 by means of the series transformer 16 tends to rotate the arm 6 in a clockwise direction and thus maintain the maximum resistance of the liquid rheostat 4 in the secondary winding 3 of the main induction motor 1.

The gradually reduced energization of the primary winding 13 permits the arm 6 to slowly lower the plates 9 into the electrolyte, thereby reducing the resistance in the circuit of the secondary winding 3 of the main motor 1. The dashpot 45 is so designed as to permit very slow upward movement of the piston 51, until it has traveled beyond the cylinder 47, thereby effecting a gradual lowering of the plates 9 into the electrolyte. It should be noted that the series transformer 16 and the dashpot 45 may be employed in the same control system or either one may be used separately to prevent the momentum of the motor 5 and of the arm 6 from lowering the plates 9 too rapidly through the electrolyte 12, during the initial portion of the starting period.

The upward movement of the counterweight end of the arm 6 has previously opened the contactor 37, causing the circuit comprising the actuating coil 29 to become de-energized, thereby causing the time-limit relay 28 slowly to resume its lower position. The lowering of the contact bridge 28a breaks the circuit comprising the actuating coil 31, thereby opening contactor 32.

When contactor 32 is opened, the actuating coil 19 is de-energized and the circuit-breaker 18 would open, if it were not held by the no-voltage release mechanism 41, which is energized from the potential transformer 17 through a circuit comprising conductors 70, 109 and 143, the actuating coil 44 of the no-voltage release mechanism 41, conductor 144, lower contact bridge 33b of the under-voltage release device 33, conductor 145, the contact terminal 108, contact segment 106, conductors 114, 115 and 68 to the potential transformer 17.

In the event of an under-voltage condition on the line conductors 62 and 63, the coil 34 of the under-voltage release device 33, which is energized from the main-motor primary circuit through conductors 146 and 147, opens both the circuit through which actuating coil 19 of the circuit-breaker 18 is energized and the circuit through which the holding coil 44 of the no-voltage release mechanism 41 is energized, thereby opening the circuit-breaker 18. It is apparent that an over-voltage release device may also be so connected across the line conductors 62 and 63, that it will break the circuits to coil 19 and to coil 44, when the voltage increases to a predetermined value.

When the time-limit relay 25 has assumed its closed position, as has previously been described, a circuit is established from the transformer 17, through conductors 70, 71, 72, 131 and 148, contact bridge 25a of the time-element relay 25, conductor 149, actuating coil 22 of the contactor 21, and conductors 150, 77, 78, 79 and 80 to supply conductor 68, thereby energizing coil 22, which causes the contactor 21 to assume its upper position.

When the contactor 21 assumes its upper position, full voltage is impressed from the series transformer 16 through conductors 151, 152 and 153, the contact bridges 21a, 21b and 21c and the sets of conductors 140, 141 and 142 and 84, 85 and 86 to the primary winding 13 of the torque motor 5.

The torque motor 5 is now responsive to full voltage from the series transformer 16 and, therefore, but slowly lowers the plates 9 into the electrolyte 12 until the rheostat is completely short-circuited.

The motor 1 may be de-energized by interrupting the circuit comprising the no-voltage release mechanism 44, thereby opening the circuit-breaker 18. This can be done by breaking the contact between the contact terminal 108 and the contact segment 106 of the controller 40. The opening of the circuit-breaker 18 causes the contact bridge 20a to asume its lower position, thereby interrupting the circuit through which the actuating coil 26 of the time-limit relay 25 is energized. The opening of the time-limit relay 25 de-energizes the actuating coil 22 of the contactor 21, causing it to assume its lower position and, as the series transformer 16 is de-energized by the opening of circuit-breaker 18, the torque motor 5 will be de-energized.

Before re-starting the main motor 1, it is necessary to proceed through the same preliminary operations as have already been described. For the sake of clearness and because various satisfactory control methods are well known in the art, reversing circuits for the main motor have been omitted from the drawing and a description thereof from the specification.

It is apparent to those skilled in the art that a control system constructed in accordance with my invention makes it impossible to start a main motor before full resistance is connected in circuit with its secondary winding and, after the motor is started, this resistance is automatically short-circuited in accordance with the condition of the motor.

While I have shown a preferred form of my invention, I do not wish to be restricted to the specific circuits, structural details or arrangement of parts herein set forth, as various modifications may be effected within the spirit and scope of my invention. I desire, therefore, that only such limitations shall be imposed as are indicated in the appended claims.

I claim as my invention:

1. The combination with a torque motor, of a series transformer for controlling the operation of said motor during normal running conditions and a potential transformer for controlling the operation of said motor during abnormal conditions.

2. The combination with a torque motor, of a series transformer for controlling the operation of said motor during normal running conditions, a time-limit relay for governing the connections of said series transformer, and a potential transformer for controlling the operation of said motor during abnormal conditions.

3. The combination with a torque motor, of a series transformer for controlling the operation of said motor during normal conditions, a time-limit relay for governing the connections of said series transformer, a potential transformer for controlling the operation of said motor during abnormal conditions, and a second time-limit relay for controlling the energization of said motor by said potential transformer.

4. The combination with a main motor and a rheostat for controlling the operation of said motor, of a torque motor for regulating said rheostat, a series transformer for controlling said torque motor during its normal operation, a time-limit relay for governing the connections of said series transformer, a potential transformer for controlling the operation of said torque motor during abnormal conditions, and a second time-limit relay for controlling said potential transformer.

5. The combination with a main motor and a rheostat for controlling the operation of said motor, of a torque motor for regulating said rheostat, a series transformer for controlling the normal operation of said torque motor, and a potential transformer for controlling the operation of said torque motor during abnormal conditions.

6. The combination with a main motor, of a liquid rheostat for regulating said motor, a torque motor for operating said rheostat, a time-limit relay for starting said torque motor and a second time-limit relay for controlling the voltage applied to said torque motor prior to attaining running conditions of said main motor.

7. The combination with a motor, of a liquid rheostat for regulating said motor, a torque motor for operating said rheostat, a time-limit relay, a latching coil acting in conjunction with said relay for starting said torque motor, and a second time-limit relay for controlling the voltage applied to said torque motor.

8. The combination with a torque motor having a plurality of positions, of a series transformer for operating said motor under normal running conditions and a potential transformer for so energizing said motor that it occupies a predetermined position prior to its energization by said series transformer.

9. The combination with a main induction motor having a primary and secondary winding, of a liquid rheostat connected to said secondary winding, a torque motor for governing the operation of said rheostat, a potential transformer for so energizing said torque motor that the resistance of said rheostat is connected in circuit with said secondary winding prior to energizing said main motor and a series transformer for energizing said torque motor in accordance with the current traversing the primary winding of said main motor.

10. The combination with a main induction motor having a primary and secondary winding, of a liquid rheostat connected to said secondary winding, a torque motor for governing the operation of said rheostat, a source of electrical energy, a switch for connecting the primary winding of said main motor to said source, a potential transformer for so energizing said torque motor that the resistance of said rheostat is connected in circuit with said secondary winding, a time-element relay for preventing said switch from closing prior to the resistance of said rheostat being connected to the secondary winding of said main motor, a series transformer energized in accordance with the current of said main motor for energizing said torque motor and means comprising a second time-element relay for increasing the energization of said series transformer upon said main motor having operated a predetermined time.

11. The combination with a main motor, a circuit-breaker and a liquid rheostat for controlling the operation of said motor, of a torque motor for regulating said rheostat, a series transformer for operating said torque motor during normal running conditions, and a potential transformer for operating said torque motor during abnormal conditions and means for rendering said potential transformer inoperative prior to the closure of said circuit-breaker.

12. The combination with a main motor, a liquid rheostat for regulating the operation of said main motor, and a torque motor provided with an arm for actuating said rheostat, of a double-diameter dash pot for controlling the rapidity of movement of said arm in accordance with the degree of acceleration of said main motor, a series transformer for operating said torque motor during normal running conditions, a time-limit relay for controlling the voltage of said series transformer, a potential transformer for operating said torque motor during abnormal conditions, a second time-limit relay for disconnecting said potential transformer from said torque motor circuit and connecting said series transformer to said circuit, and a shunt latching device for locking said arm during the time interval between the disconnection of said potential transformer from said torque motor circuit and the connection of said series transformer thereto.

In testimony whereof, I have hereunto subscribed my name this 20th day of July, 1920.

GEORGE W. HUEY.

Nov. 30, 1926.
W. A. KEUNE
UNIFORM FLOW SCALE
Filed August 10, 1925
1,608,796
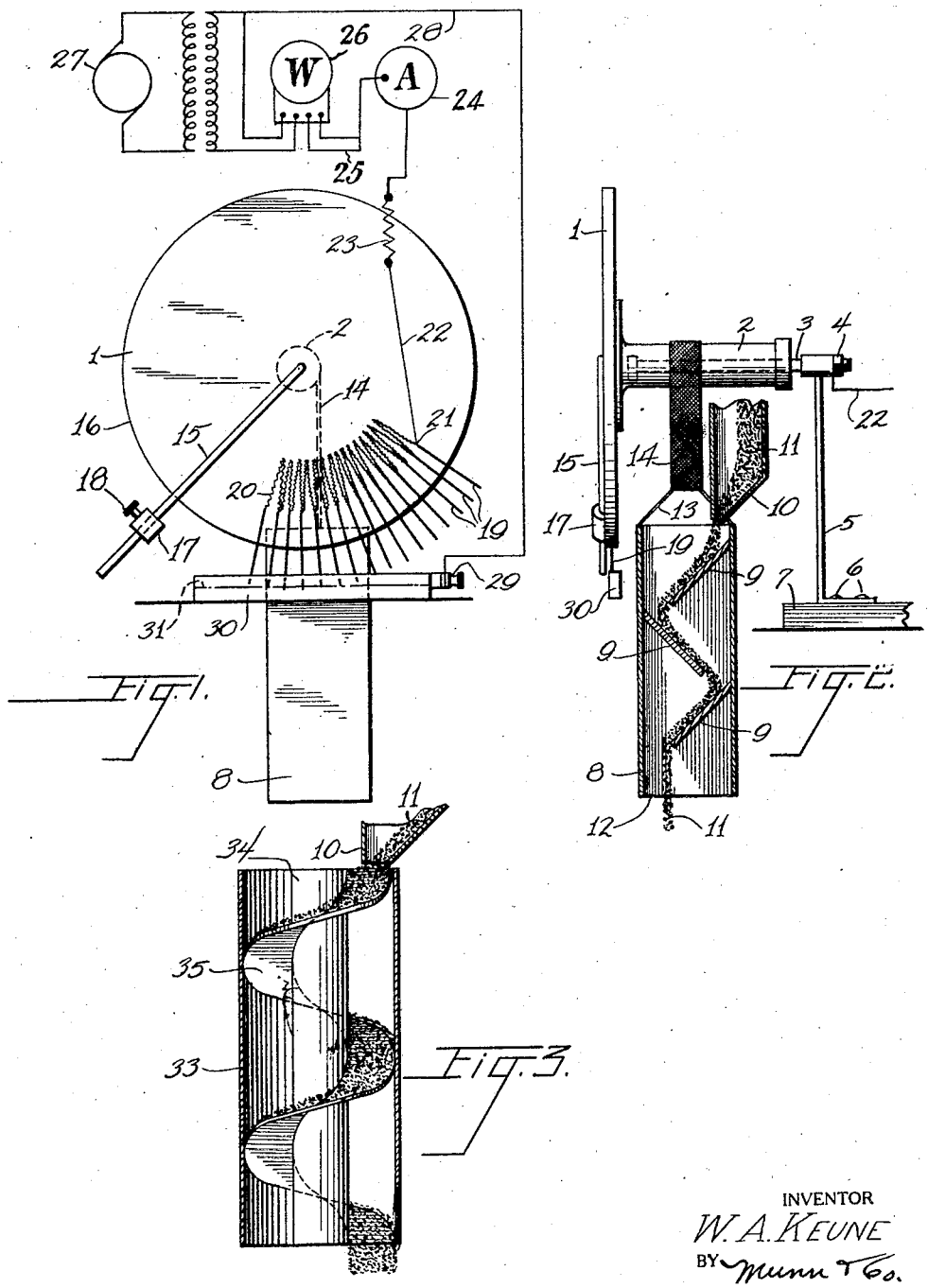
INVENTOR
W. A. KEUNE
BY Munn & Co.
ATTORNEYS